Patented Aug. 10, 1937

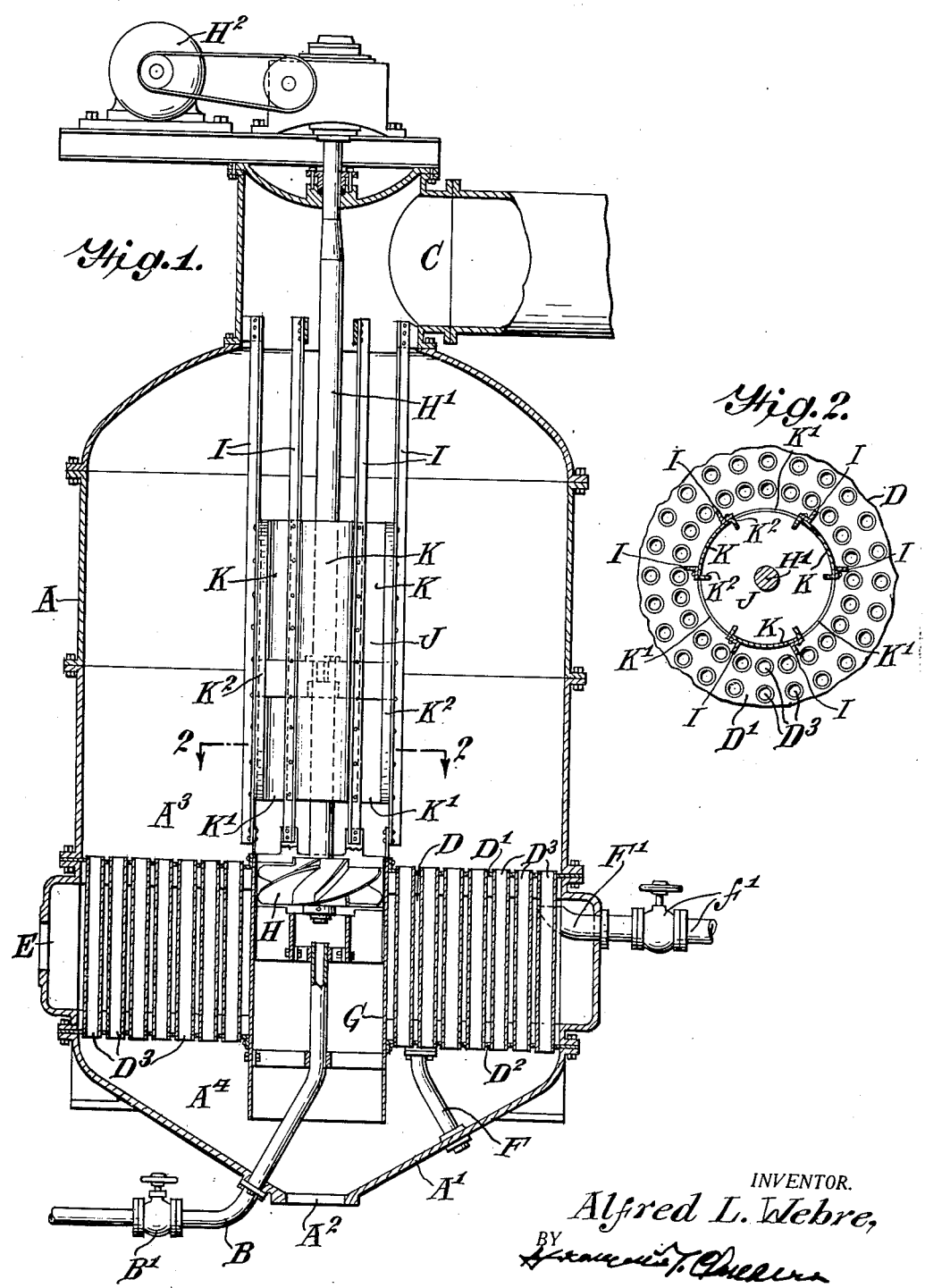

2,089,314

UNITED STATES PATENT OFFICE 2,089,314

VACUUM PAN

Alfred L. Webre, Merion, Pa., assignor to United States Pipe and Foundry Company, Burlington, N. J., a corporation of New Jersey Application February 26, 1936, Serial No. 65,783

2 Claims. (Cl. 159—27)

My invention relates to vacuum pans of the type in which the pan is divided into upper and lower compartments by a steam belt through which an upward flow of the contents of the pan passes and with a downflow conduit extending through the steam belt for the down flow of the liquid contents of the pan and while the heating of the contents of the pan as it passes through the steam belt would bring about a natural circulation it is generally desirable that an impeller should be located in the downflow conduit through the steam belt to bring about a forced and more energetic circulation. In such vacuum pans as heretofore generally constructed, the circulation through the upper chamber of the pan as its liquid level increases, has not been satisfactory owing to the fact that a portion of the heated charge passing through the steam belt does not reach to the upper level but is, so to speak, short-circuited by being drawn into the return conduit prematurely with consequent impairment of the efficiency of the vacuum pan. Having this defect in view, I devised the construction shown in my Patent 1,958,078, of May 8, 1934, which has proved in practice to be efficient and highly desirable, particularly in the treatment of very viscous charges of massecuite but where the massecuite under treatment is more fluid it has been found that the provision of impellers in the rings making up the return flow conduit extending through the upper chamber of the vacuum pan are not necessary and that the conduit as described in my said patent is effective in bringing about a satisfactory circulation where the only impeller is located in the conduit section extending through the steam belt. Having ascertained that impellers in the conduit extending through the upper chamber of the vacuum pan may, under certain conditions, be dispensed with, I have conceived the idea that by providing for an inflow of the massecuite under treatment to the return flow conduit extending through the upper chamber of the pan at substantially all levels throughout the effective length of the conduit and by providing the so constructed conduit with inwardly extending ribs or flanges an improved circulation could be brought about and, carrying out this conception, I have formed the return flow conduit extending through the upper chamber of the pan with longitudinal slots or openings placing the interior of the conduit in free communication with the upper chamber of the pan throughout substantially the effective length of the conduit and by providing the conduit with approximately vertical inwardly extending ribs or flanges I have ascertained that such a construction brings about an improved circulation in that the greater part of the massacuite heated by passage through the steam belt reaches the upper level in the upper chamber before being drawn into the return flow conduit and carried therethrough to the lower chamber of the vacuum pan. My invention, therefore, consists, generally speaking, in combining with a vacuum pan divided into upper and lower chambers by a steam belt and having a return flow conduit extending through the steam belt, a return flow conduit extending into the upper chamber of the vacuum pan and communicating with the return flow conduit through the steam belt which is formed with longitudinal slots extending substantially through its effective length and affording free communication between the interior of the conduit and the upper chamber of the vacuum pan at substantially all levels of the fluid contents of the pan and by locating in the so-constructed conduit substantially vertical inwardly extending ribs or flanges serving to more effectually prevent inflow of liquid into the column at undesirable levels as well as to prevent outflow of portions of the downwardly moving liquid column in the conduit into the surrounding chamber of the vacuum pan. By preference, I use in my improved apparatus an impeller in the conduit leading through the steam belt to bring about a forced circulation though, under certain conditions, such an impeller may be dispensed with and reliance had upon natural circulation brought about by the heating of the charge in the steam belt.

The return flow conduit extending through the upper chamber of the vacuum pan may be varied in constructive detail in many ways so long as provision is made for such longitudinal slotting of the walls of the conduit as will place its interior in free communication with the upper chamber of the vacuum pan throughout substantially its effective length and I have, in the drawing forming part of this specification, illustrated a construction in which, by preference, I provide the conduit with substantially vertical continuous slots, from the edges of which extend inwardly substantially vertical ribs or flanges serving, I believe, to more effectively segregate the downflowing liquid from the liquid in the surrounding chamber and diminish the liability of an inflow into the conduit at levels substantially below the upper level of the liquid charge in the vacuum pan.

My invention will be best understood as described in connection with the drawing forming part of this specification in which Figure 1 is a central sectional elevation of a vacuum pan embodying my improvement in what I consider to be its preferential form, and Figure 2 is a cross-section on the line 2—2 of Fig. 1.

A indicates the shell of the vacuum pan which is provided with a hopper shaped bottom $A^1$ from which leads a discharge opening $A^2$. B is a conduit leading through the bottom of the vacuum chamber for the introduction of the syrup to be concentrated. This conduit is provided with a valve $B^1$ and, as shown, has its outlet opening located in a down-take conduit element, indicated at G. C is a vapor conduit leading from the top of the vacuum pan and which, in apparatus of this kind, is connected with a condenser not shown. D is a steam belt which, as shown, has upper and lower tube sheets $D^1$ and $D^2$ connected to the sides of the vacuum pan and to the cylindrical down-take element G. $D^3$, $D^3$, etc., are multiple tubes passing through the steam belt and connected to the upper and lower tube sheets. At E, I have indicated an inlet passage for steam and at F a drain pipe for condensate formed in the steam belt. At $F^1$ I have indicated an outlet conduit from the steam belt which, as described in my United States Patent 1,835,250, may be connected with a vacuum pipe, $f^1$ indicating a valve by which this conduit can be opened and closed. G is a down-take conduit element passing through the steam belt and, as shown, forming the inner wall of the steam belt, connecting, as do the tubes $D^3$, the upper and lower divisions or chambers of the vacuum pan which I have marked respectively as $A^3$ and $A^4$.

H is a screw propeller generally referred to in apparatus of the kind in question as an impeller which is located in the down-take conduit G and driven by a shaft $H^1$ which, in turn, is actuated by a motor diagrammatically indicated at $H^2$. I, I, etc., indicate a series of angle iron columns disposed in a circle and secured, as shown, to the upper top sheet of the steam belt and the upper portion of the vacuum pan. J, Figs. 1 and 2, is a down-take conduit communicating at bottom with the down-take conduit G extending through the steam belt and extending upward through the chamber $A^3$ of the vacuum pan. The height of this conduit should bring its upper end to or near the level which the massecuite reaches during the operation of the pan. The conduit in Figs. 1 and 2, is shown as made up of three plates, K, K, K, secured to the angle iron columns I and spaced apart so as to leave openings $K^1$ between their edges forming longitudinal slots in the conduit by which its interior is placed in connection with the surrounding chamber $A^3$. The breadth of the slots, as shown, is equal to the breadth of the plates making up the the conduit and this proportioning I have found to be effective in bringing about a down flow of the massecuite in the conduit from the upper level of the massecuite in the pan and without an undesirable inflow of massecuite into the lower portions of the slotted conduit. By preference, I form the plates K with peripheral inwardly extending ribs or flanges $K^2$ which I believe decreases the liability of inflow into the conduit from the lower levels of the massecuite in the chamber $A^3$.

In operation, the massecuite is charged into the vacuum pan progressively so that the level in the chamber $A^3$ is progressively increased and the charged portion of the chamber $A^3$ is in free communication with the downflow conduit at all levels. The heating of the massecuite in the steam belt tends to bring about a recirculation from the lower compartment $A^4$ through the steam belt D to the upper compartment $A^3$ with the consequent down-flow through the down-flow conduit in the compartment $A^3$ and its continuation through the conduit G extending through the steam belt, this circulation being preferably made more positive and rapid by the operation of the impeller H in the conduit G. The massecuite moving upward through the chamber $A^3$ is, by reason of its greater heat and the presence of steam bubbles, appreciably lighter than is the massecuite moving downward through the return flow conduit, the heavier down-flow in the conduit having the effect of preventing any considerable inflow of massecuite through the slots in the conduit at levels materially below that of the level of the massecuite in the chamber $A^3$ so that the return flow conduit is charged for the most part with a heavier and cooler massecuite drawn from the top level and there is but little tendency to an inflow of the hotter and lighter massecuite in the lower levels of the chamber $A^3$ and I believe that the tendency of an inflow through the lower levels is further diminished by the provision of inwardly extending vertical ribs at the edges of the plates making up the downflow conduit as, for example, as indicated at $K^1$ in Figs. 1 and 2, such ribs also serving to check any tendency toward a rotative movement in the massecuite flowing downward through the return flow conduit.

Having now described my invention, what I claim as new and desire to secure by Letters Patent, is:

1. In a vacuum pan comprising upper and lower compartments separated by a steam belt and having a downflow conduit extending through the steam belt, the combination therewith of a downflow conduit forming a continuation of the conduit through the steam belt and extending into the upper compartment of the vacuum pan, said conduit having longitudinally slotted walls adapted to afford free communication between the inside of the conduit and the upper chamber of the vacuum pan through substantially the entire length of the conduit and in which the slotted downflow conduit extending through the upper chamber of the vacuum pan is provided with inwardly extending ribs.

2. In a vacuum pan comprising upper and lower compartments separated by a steam belt and having a downflow conduit extending through the steam belt, the combination therewith of a downflow conduit forming a continuation of the conduit through the steam belt and extending into the upper compartment of the vacuum pan, said conduit having longitudinal and approximately vertical slots, placing the inside of the conduit in substantially free communication with the upper chamber of the vacuum pan throughout the effective length of the conduit and having longitudinal ribs extending from the edges of the longitudinal slots toward the center of the conduit.

ALFRED L. WEBRE.